United States Patent [19]

Handler et al.

[11] Patent Number: 4,581,828
[45] Date of Patent: Apr. 15, 1986

[54] SPIRIT LEVEL

[75] Inventors: Milton E. Handler, Northbrook; Richard Sylvan, Glenview; Michael Peterson, Evanston, all of Ill.

[73] Assignee: Hirsh Company, Skokie, Ill.

[21] Appl. No.: 737,772

[22] Filed: May 29, 1985

[51] Int. Cl.⁴ .............................................. G01C 9/28
[52] U.S. Cl. .......................................... 33/379; 33/381
[58] Field of Search ........................ 33/379, 348, 381

[56] References Cited

U.S. PATENT DOCUMENTS

| | | |
|---|---|---|
| 650,751 | 5/1900 | Desmariais . |
| 786,269 | 4/1905 | Curry . |
| 876,720 | 1/1908 | King . |
| 1,225,132 | 5/1917 | Johnson . |
| 1,233,756 | 7/1917 | Cox . |
| 1,462,430 | 7/1923 | Vogel . |
| 1,777,429 | 10/1930 | Charlton . |
| 1,826,731 | 10/1931 | Chatham . |
| 2,502,235 | 3/1950 | Schultes . |
| 2,502,905 | 4/1950 | Vaida . |
| 2,576,202 | 11/1951 | Wullschleger . |
| 2,639,514 | 5/1953 | Garrison . |
| 2,646,628 | 7/1953 | Shaler . |
| 2,810,206 | 10/1957 | Ziemann . |
| 2,948,066 | 8/1960 | Rosenholm . |
| 2,993,281 | 7/1961 | Dock . |
| 3,167,870 | 2/1965 | Streeter . |
| 3,190,010 | 6/1965 | Johnson . |
| 3,311,990 | 4/1967 | Wright . |
| 3,442,024 | 5/1969 | Don . |
| 3,456,354 | 7/1969 | Wright . |
| 3,593,428 | 7/1971 | Jacoff . |
| 3,738,015 | 6/1973 | DeJong . |
| 3,750,301 | 8/1973 | Johnson . |
| 3,793,735 | 2/1974 | Humphrey . |
| 3,835,549 | 9/1974 | DeJong . |
| 3,869,806 | 3/1975 | Humphrey . |
| 4,011,660 | 3/1977 | Johnson . |
| 4,124,940 | 11/1978 | Vaida . |
| 4,208,803 | 6/1980 | Brown . |
| 4,335,524 | 6/1982 | Schimming . |
| 4,407,075 | 10/1983 | MacDermott . |

Primary Examiner—Harry N. Haroian
Attorney, Agent, or Firm—Dressler, Goldsmith, Shore, Sutker & Milnamow, Ltd.

[57] ABSTRACT

A spirit level is provided which may be conveniently packaged and sold in knocked down form with the liquid vials and vial holders initially separated from the frame. The mounting openings in the web of the frame are rectangular or square with sides parallel and perpendicular to the working surfaces of the frame. The vial holders comprise a pair of opposed mating members of complementary configuration with the opening and having four pairs of mounting tabs for positioning the vial in accurate parallel or vertical orientation by cooperating with the corners of the rectangular opening. The holders also comprise posts which cooperate with the pairs of tabs to urge the tabs into gripping engagement with the corners of the mounting openings.

17 Claims, 8 Drawing Figures

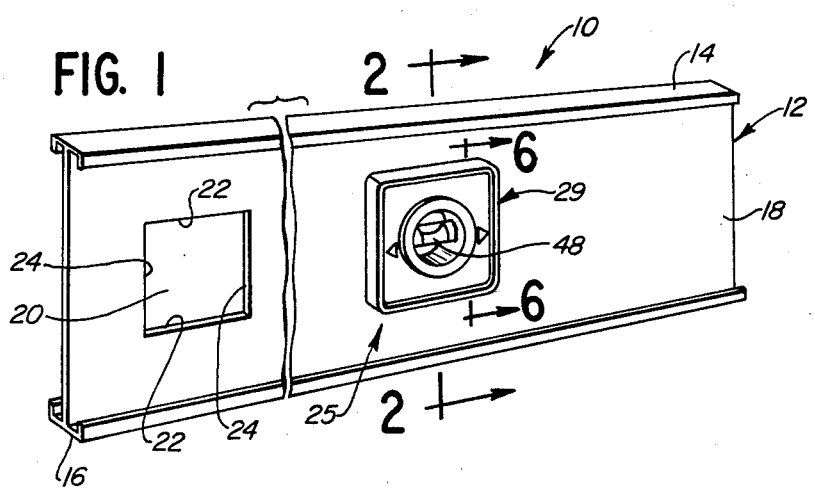
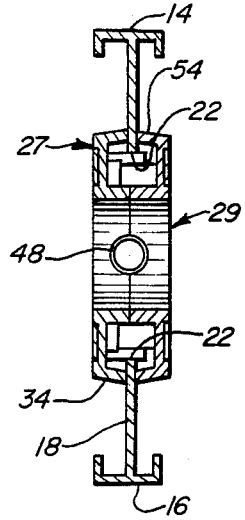
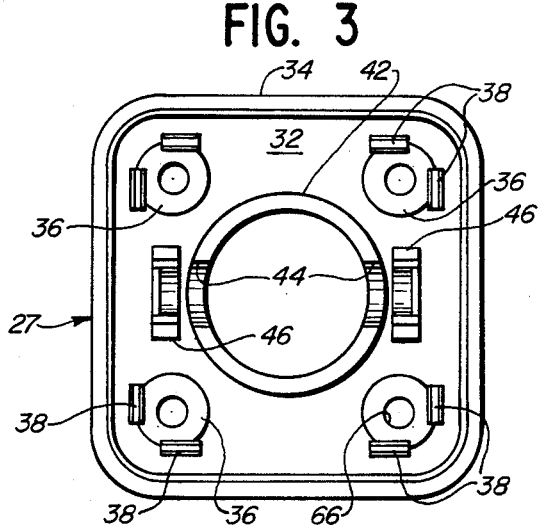
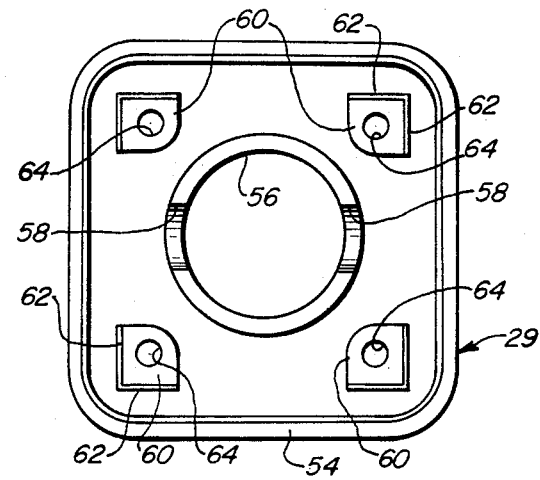
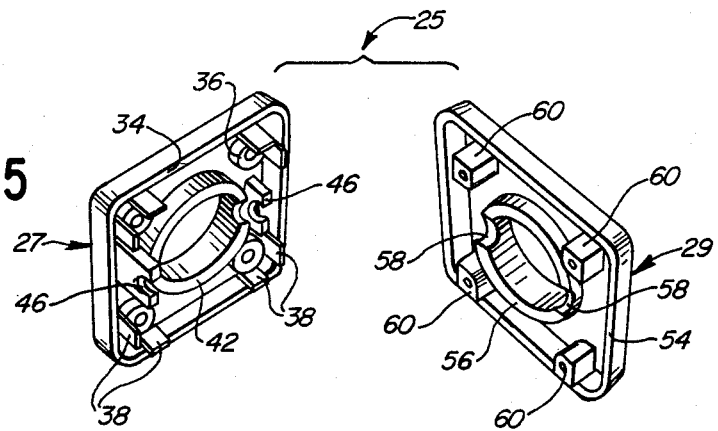

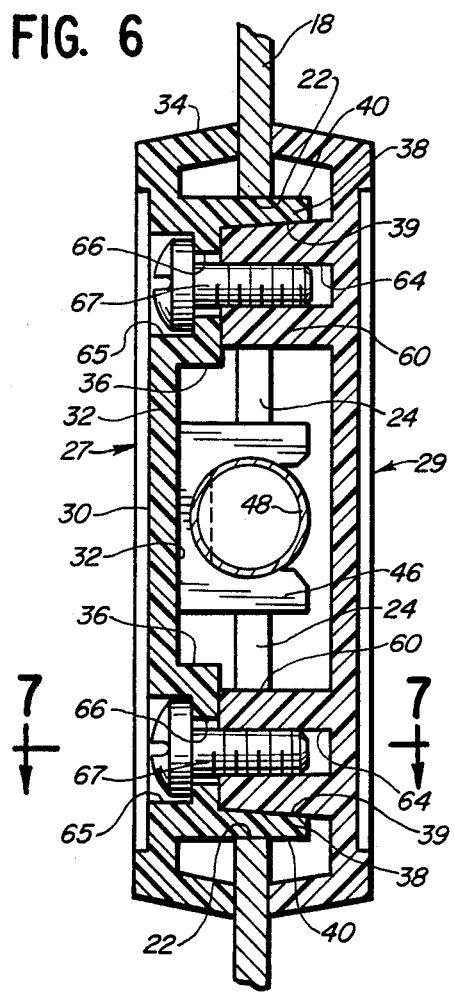
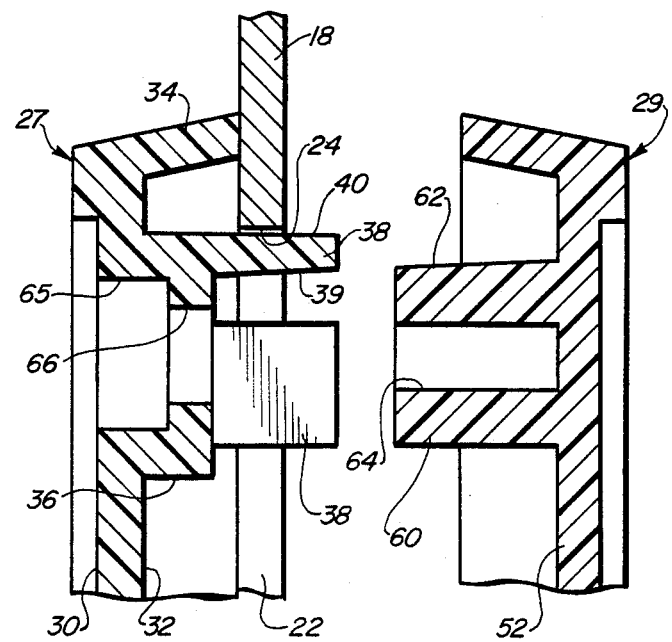
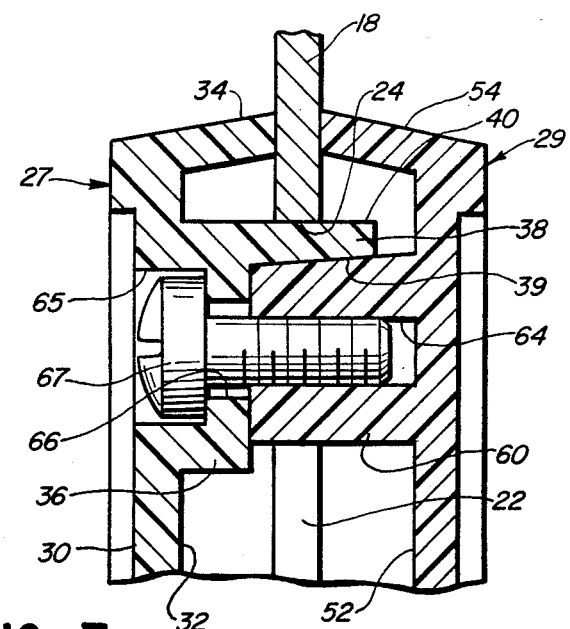

SPIRIT LEVEL

TECHNICAL FIELD

This invention relates to spirit levels and, more particularly, to an improved spirit level which may be easily and accurately assembled by the purchaser without special knowledge or tools.

BACKGROUND OF THE INVENTION

Spirit levels are old and well known and enjoy wide usage by artisans, such as, carpenters and masons, as well as by relatively unskilled laymen, such as, homeowners and hobbyists. In general, a spirit level comprises an elongated frame having at least one straight, planar surface and a vial or vials carried by the frame. The vial contains a liquid with an entrapped bubble. Typically, the planar surface is placed on or against a workpiece and, when the bubble is perfectly centered between the markings on the vial, that workpiece is known to be level or straight. Of course, the accuracy of the spirit level is dependent upon a precise geometric relationship between the axis of the vial and the straight surfaces of the frame, e.g., parallel or perpendicular thereto.

A matter of primary importance relating to spirit levels is the accurate mounting and retention on the frame of the liquid vial to achieve the precise geometric relationship required. Where cost is no object, such precision mounting can be achieved with expensive manufacturing techniques wherein notches, grooves and the like are made to close tolerances in the frame, and the level is permanently pre-assembled by the manufacturer.

However, the cost of a level is a major concern to the average purchaser and user of such devices. Moreover, most relatively inexpensive spirit levels are sold in knocked down form, that is, with the liquid vials separate and unmounted in the frame. Under those circumstances, the assembly of the level and accurate mounting of the liquid vial or vials on the frame can present difficult problems for the average person.

As an indication of the multitudinous efforts that have heretofore been made to supply the ideal spirit level, the following U.S. Pat. Nos. were located during a prior art search related to the subject invention: 650,751, 786,269, 876,720, 1,225,132, 1,233,756, 1,462,430, 1,777,429, 1,826,731, 2,502,235, 2,502,905, 2,576,202, 2,639,514, 2,646,628, 2,810,206, 2,948,066, 2,993,281, 3,167,870, 3,190,010, 3,311,990, 3,442,024, 3,456,354, 3,593,428, 3,738,015, 3,750,301, 3,793,735, 3,835,549, 3,869,806, 4,011,660, 4,124,940, 4,208,803, 4,335,524, and 4,407,075.

While all of the cited references deal with spirit levels, the disclosed designs can be characterized as exhibiting one or more of the problems inherent in such devices, such as, high cost, difficulty of assembly, precision mounting requirements, likelihood of misalignment during use, and the like, which render them unsuitable for sale in knocked down form to the average unskilled person. Typically, the mounting openings of the prior devices (except for that disclosed in U.S. Pat. No. 1,797,429) are circular, or some complex variation of circular, which makes difficult the accurate positioning of the vials.

There thus exists a need for a spirit level which is relatively inexpensive and has mounting means which are substantially foolproof so that the average person can readily assemble the level and accurately mount the vials thereon.

SUMMARY OF THE INVENTION

The present invention provides an inexpensive spirit level which can be sold in knocked down form and yet has simple means for attaching the liquid vials and insuring that the necessary precise geometric relationship is achieved and maintained.

The invention comprises a frame, which may be in the typical form of an I-bar having a pair of planar straight surfaces interconnected by a web. Mounting openings are formed in the web, and the openings are rectangular or square, with their sides parallel or perpendicular to the straight surfaces. In the preferred embodiment, a two-piece vial holder is provided with a first holder member having a pair of cradles for snap-fit retention therein of a liquid vial. The first holder member also has four pairs of upwardly projecting tabs which, in totality, define a rectangle or square of substantially the same dimension as the mounting opening in the frame web, and which include tapered surfaces for insuring easy and accurate insertion thereof with the mounting openings.

The second holder member has four downwardly projecting posts which likewise define a rectangle or square, but of slightly smaller dimension. The posts are adapted to fit into the pairs of tabs on the first holder member and provide an outwardly camming relationship therewith.

The two vial holder members are press fit together through one of the mounting openings from opposite sides of the web. The two holder members are then firmly secured together, as with screws, thereby gripping the web therebetween. As a result of the camming cooperation between the pairs of tabs and posts, the tabs are wedged outwardly against the marginal edges of the web mounting opening to accurately position and maintain the vial in the desired parallel or perpendicular relationship.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout the same, FIG. 1 is a perspective view of a spirit level embodying the principles of the invention;

FIG. 2 is an enlarged sectional view taken on the plane of line 2—2 in FIG. 1;

FIG. 3 is a further enlarged plan view of the inner surface of one of the vial holder members;

FIG. 4 is a similar view of the second vial holder member;

FIG. 5 is a perspective view of the two vial holder members shown in exploded, partially face-to-face relationship;

FIG. 6 is a further enlarged, fragmentary, cross-sectional view taken on the plane of line 6—6 in FIG. 1;

FIG. 7 is a still further enlarged, fragmentary, cross-sectional view taken on the plane of line 7—7 in FIG. 6; and FIG. 8 is a view similar to FIG. 7 but showing a post separated from its associated tab pair.

DETAILED DESCRIPTION OF THE PREFERRED EMBODIMENT

Referring now with greater particularity to the various Figures of the drawings, it will be seen that the reference numeral 10 indicates generally a spirit level embodying the principles of the invention. Spirit level 10 comprises a frame member 12 which, in cross-section has an I-beam configuration. The frame member 12 includes upper and lower straight planar surfaces 14 and 16 and an interconnecting planar web 18.

The web 18 is provided with one or more rectangular or square mounting openings 20. In the embodiment illustrated, the two spaced-apart openings 20 each have a square configuration and each have sides 22, 22 parallel to the straight surfaces 14 and 16 and sides 24, 24 perpendicular to said straight surfaces. Such square or rectangular openings 20 with parallel and perpendicular sides are, of course, readily achievable with common manufacturing techniques.

A vial holder indicated generally by the numeral 25 is releasably associated with the opening 20, said holder 25 comprising a pair of opposed and mating vial holder members 27 and 29. The first holder member 27 comprises a generally square member having an outer face 30 (FIG. 6), an inner face 32 (FIG. 3), and a perimetral tapered rim 34 (FIGS. 2 and 3) projecting inwardly from the inner face 32. The rim 34 has a dimension larger than that of the square mounting opening 20.

Annular mounting collars 36 project from the inner face 32, one each inwardly of, and adjacent, the corners of the rim 34. Projecting upwardly adjacent each of the mounting collars 36 is a pair of perpendicularly oriented tabs 38, 38 (FIGS. 3 and 5). A square path traced about the four pairs of tabs 38 describes a square of substantially the same dimension as the mounting opening 20.

As best illustrated in FIG. 8, each tab 38 has an inner surface 39 and an outer surface 40 which are each formed with slight tapers, approximately 3° in the embodiment illustrated, for reasons which will become apparent as the description proceeds.

An annular vial collar 42 (FIGS. 3 and 5) projects upwardly from the center of the inner face 32 of the first member 27, and the collar 42 is provided with a pair of diametral, semi-circular notches 44. A pair of resilient cradles 46, 46 projects upwardly from the inner face 32 in direct alignment with the notches 44. The cradles 46 and notches 44 are adapted to frictionally receive and retain therein a cylindrical liquid vial 48.

The second vial holder member 29 (FIGS. 2 and 4-8) is of complementary, substantially square configuration and comprises an inner face 52 (FIG. 4) from which projects a perimetral, tapering rim 54. A central, annular collar 56 projects upwardly from the inner face 52. The collar 52 is formed with diametral, semi-circular notches 58, and is adapted to lie in registry with the collar 42 for retaining the vial 48 therebetween.

Connector posts 60 project upwardly from the inner face 52 of member 29, one each adjacent the four corners of the rim 54. Each post 60 has two outer faces 62, 62 at right angles to each other, and the faces 62 define a square of substantially the same dimension as that defined by the inner faces 39 of the tabs 38. The faces 62 of the posts 60 are likewise formed with a complementary, slight taper of approximately 3°. For operationally connecting together the holder members 27 and 29 with screws 67 or the like, the posts 60 define bores 64, and the member 27 is provided with screw-receiving bores 66 and counter bores 65 (FIG. 6) for receiving the heads of the screws 67.

The spirit level 10 normally would be purchased in knocked down form, that is, with the frame member 12, vials 48, and vial holders 25 all separate and detached. To operationally assemble the level 10, a vial 48 is first snap-fit into the cradles 46 and associated notches 44 on the first holder member 27. The holder member 27, and particularly the tabs 38 thereof, is then positioned in a mounting opening 20. The right angle arrangement of the tabs 38 insures accurate aligned positioning of the member 27 in the mounting opening 20, while the tapered outer faces 40 of the tabs 38 facilitate insertion thereof through the opening.

The second vial holder 29 is next positioned in the mounting opening 20 by inserting the posts 60 into the pairs of tabs 38 and with the vial-retaining notches 58 in registry with the notches 44. The tapered faces 62 of the posts 60 facilitate insertion of the posts into their associated tab pairs. The members 27 and 29 are then firmly fastened together with the screws 67 as illustrated in FIGS. 6 and 7 of the drawings. It is important to note that this final firm fastening causes the tapered post faces 62 to cam the tabs 38 outwardly so that the outer faces 40 of said tabs 38 are caused to bear snugly against the sides 22 and 24 of the opening 20.

In addition, marginal areas of the web 18 around the mounting opening 20 are gripped between the rims 34 and 54 of the holder members. As a result of the described coaction, the initially precise relationship of the vial 48 with the frame straight edges 14 and 16 (parallel or perpendicular) is maintained, and inadvertent misalignment during use of the instrument is prevented.

While the frame member 12 may be fabricated of various metals or other suitable materials, the vial holder members 27 and 29 may be inexpensively molded from suitable plastics, such as polyvinyl chloride, which provide the desired resilience of the tabs 38 and cradles 46. It will also be appreciated that the mounting openings 20 could be rectangular as well as square and still retain the described right angle self-positioning and camming relationship.

It will be readily observed from the foregoing detailed description of the invention and from the illustrated embodiment thereof that numerous variations and modifications may be effected without departing from the true spirit and scope of the novel concepts or principles of the invention.

What is claimed is:

1. A level comprising:
   a frame having at least one straight surface and a web connected thereto;
   a mounting opening formed in said web;
   opposed first and second vial holder members overlying said opening and operationally connected together through said opening;
   a liquid vial retained between said holder members;
   positioning means on said first holder member cooperating with the opening for selectively positioning said holder members with the vial oriented parallel or perpendicular to said straight surface; and
   camming means on said holder members cooperating to urge portions thereof into engagement with the sides of said opening to maintain the vial in the selected orientation.

2. A level according to claim 1 wherein said opening comprises a geometric figure having sides parallel to said straight surface and sides perpendicular to said straight surface, and said positioning means comprises tabs complementarily parallel to said straight surface and perpendicular to said straight surface.

3. A level according to claim 2 wherein said opening comprises a rectangle and said positioning means comprises pairs of perpendicularly oriented tabs adapted to cooperate with said web adjacent the corners of said rectangular opening.

4. A level according to claim 3 wherein said positioning means comprises four pairs of said tabs projecting inwardly from said first holder member and arranged to define a rectangle of substantially the same dimensions as said rectangular opening.

5. A level according to claim 4 wherein the outer surface of each of said tabs is slightly tapered for facilitating insertion of said tabs through said opening.

6. A level according to claim 4 wherein said camming means comprises tapered inner surfaces on said tabs and four posts projecting inwardly from the second of said holder members to define a rectangle of substantially the same dimensions as said inner tab surfaces, said posts being insertable into said pairs of tabs.

7. A level according to claim 6 wherein said posts define outer right angle surfaces, said right angle surfaces being complementarily tapered and adapted to urge said tabs outwardly into engagement with said web adjacent the corners of said rectangular opening.

8. A level according to claim 6 wherein each said holder member defines a perimetral rim projecting inwardly therefrom outwardly of said tabs and posts, said rims gripping therebetween marginal portions of said web around the mounting opening.

9. A level comprising:
a frame having parallel straight surfaces and a web interconnecting said surfaces;
a rectangular opening formed in said web and having sides parallel to said straight surfaces and sides perpendicular to said surfaces;
a pair of opposed vial holder members overlying said opening and operationally connected together through said opening;
a liquid vial retained between said holder members; and
four pairs of tabs projecting inwardly from one of said holder members and defining a rectangle of substantially the same dimensions as said opening, said tabs cooperating adjacent the corners of said opening to selectively position the holder members with the vial oriented parallel or perpendicular to said straight surfaces.

10. A level according to claim 9 wherein the outer surfaces of said tabs are slightly tapered to facilitate insertion of said tabs through said opening.

11. A level according to claim 10 comprising camming means on said holder members cooperating to urge said tabs into engagement with the web adjacent the corners of said opening to maintain the vial in the selected orientation.

12. A level according to claim 11 wherein said camming means comprises tapered inner surfaces on said tabs and four posts projecting inwardly from the other of said holder members and defining a rectangle of substantially the same dimensions as said inner tab surfaces, said posts being insertable into said pairs of tabs.

13. A level according to claim 12 wherein said posts comprise outer right angle surfaces, said right angle surfaces being complementarily tapered and adapted to urge said tabs outwardly into engagement with the web adjacent the corners of said opening.

14. A level comprising:
an elongated rigid frame having parallel straight surfaces and a web interconnecting said surfaces;
at least one square opening formed in said web and having sides parallel to said straight surfaces and sides perpendicular to said straight surfaces;
a cylindrical liquid vial;
a vial holder comprising a pair of substantially square holder members overlying said opening, said vial holder including means releasably retaining said liquid vial therein;
connector means releasably connecting said holder members together through said opening;
four pairs of tabs projecting inwardly from one of said holder members and defining a square of substantially the same dimension as said opening and cooperating with the corners of said opening to selectively position said vial parallel or perpendicular to said straight surfaces; and
four camming posts projecting inwardly from the other of said holder members inserted into said pairs of tabs and urging said tabs into engagement with the web adjacent the corners of said opening to maintain the vial in the selected orientation.

15. A level according to claim 14 wherein the inner and outer surfaces of said tabs are tapered, said tapered outer surfaces facilitating insertion of said tabs through said opening, said camming posts comprising complementarily tapered outer surfaces cooperating with the tapered inner surfaces of said tabs to urge said tabs outwardly into engagement with the web adjacent the corners of said square opening.

16. A level according to claim 15 wherein said first mentioned means for retaining said vial comprises a central annular collar projecting inwardly from said one holder member and having a pair of semi-circular notches formed therein, a pair of resilient cradles projecting inwardly from said one holder member in direct alignment with said notches, and a complementary annular collar projecting inwardly from said other holder member and defining diametral semi-circular notches formed therein.

17. A level according to claim 16 comprising perimetral rims projecting inwardly from each of said holder members and cooperating to grip marginal portions of said web surrounding said opening therebetween.

* * * * *